(12) United States Patent
Beliaev et al.

(10) Patent No.: US 12,539,048 B2
(45) Date of Patent: Feb. 3, 2026

(54) METHOD AND DEVICE FOR MEASURING HEART RATE

(71) Applicant: Samsung Electronics Co., Ltd., Suwon-si (KR)

(72) Inventors: Kirill Gennadievich Beliaev, Moscow (RU); Dmitrii Igorevich Chernakov, Moscow (RU); Viacheslav Sergeevich Kholoburdin, Moscow (RU); Vladimir Mikhailovich Semenov, Moscow (RU)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/753,732

(22) Filed: Jun. 25, 2024

(65) Prior Publication Data

US 2024/0341609 A1 Oct. 17, 2024

Related U.S. Application Data

(63) Continuation of application No. PCT/KR2022/013902, filed on Sep. 16, 2022.

(30) Foreign Application Priority Data

Feb. 16, 2022 (RU) .................. 2022104036

(51) Int. Cl.
*A61B 5/024* (2006.01)
*A61B 5/00* (2006.01)

(52) U.S. Cl.
CPC ........ *A61B 5/02427* (2013.01); *A61B 5/7214* (2013.01)

(58) Field of Classification Search
None
See application file for complete search history.

(56) References Cited

U.S. PATENT DOCUMENTS 11,717,197 B2 * 8/2023 Venugopal ............ H10F 77/334
600/323
2010/0286497 A1 11/2010 Fine et al.
(Continued)

FOREIGN PATENT DOCUMENTS

CN 112806972 A 5/2021
CN 109922722 B 7/2021
(Continued)

OTHER PUBLICATIONS

Extended European Search Report dated Apr. 16, 2025, issued in a European Patent Application No. 22927439.4.
(Continued)

*Primary Examiner* — Yi-Shan Yang
(74) *Attorney, Agent, or Firm* — Jefferson IP Law, LLP (57) ABSTRACT

A method for measuring heart rate is provided. The method includes illuminating a body portion with light, detecting light scattered by tissues of the body portion and blood particles by a plurality of photodetectors including at least one pair of photodetectors which are connected in antiparallel in each pair of photodetectors, eliminating a frequency component of motion artifacts in an analog photocurrent differential signal by subtracting a first analog photocurrent signal detected by a first photodetector of a pair of photodetectors of the at least one pair of the photodetectors from a second analog photocurrent signal detected by a second photodetector of the pair of photodetectors, converting the analog photocurrent differential signal into an analog voltage differential signal, converting the analog voltage differential signal into a digital differential signal, calculating an envelope of the digital differential signal, and calculating the heart rate from peaks of the calculated envelope of the digital differential signal.

15 Claims, 7 Drawing Sheets

(56) References Cited

U.S. PATENT DOCUMENTS

| | | | |
|---|---|---|---|
| 2012/0130263 A1* | 5/2012 | Pretorius | A61B 5/366 600/509 |
| 2016/0003736 A1 | 1/2016 | Gigler et al. | |
| 2016/0022160 A1* | 1/2016 | Pi | A61B 5/02416 600/479 |
| 2016/0058300 A1 | 3/2016 | Yoon et al. | |
| 2018/0098708 A1 | 4/2018 | Lee | |
| 2020/0033246 A1 | 1/2020 | Jobert | |
| 2020/0373452 A1 | 11/2020 | Do Valle et al. | |
| 2021/0106283 A1 | 4/2021 | Zhong et al. | |
| 2023/0277073 A1 | 9/2023 | Yang | |
| 2024/0008774 A1* | 1/2024 | Li | A61B 5/14551 |

FOREIGN PATENT DOCUMENTS

| | | | |
|---|---|---|---|
| CN | 113995389 A | 2/2022 | |
| EP | 3499215 A1 | 6/2019 | |
| EP | 3598102 A1 | 1/2020 | |
| JP | 2016-120309 A | 7/2016 | |
| KR | 10-2016-0028303 A | 3/2016 | |
| RU | 2722066 C2 | 5/2020 | |
| RU | 2758038 C1 | 10/2021 | |
| WO | WO-2021074292 A1 * | 4/2021 | G01G 17/08 |
| WO | WO-2021218784 A1 * | 11/2021 | G02B 27/28 |

OTHER PUBLICATIONS

International Search Report dated Jan. 2, 2023, issued in International Patent Application No. PCT/KR2022/013902.

Russian Search Report dated Sep. 19, 2022, issued in Russian Patent Application No. 2021137420/28.

* cited by examiner

METHOD AND DEVICE FOR MEASURING HEART RATE

CROSS-REFERENCE TO RELATED APPLICATION(S)

This application is a continuation application, claiming priority under § 365 (c), of an International application No. PCT/KR2022/013902, filed on Sep. 16, 2022, which is based on and claims the benefit of a Russian patent application number 2022104036, filed on Feb. 16, 2022, in the Russian Intellectual Property Office, the disclosure of which is incorporated by reference herein in its entirety.

BACKGROUND

1. Field

The disclosure relates to heart rate measurement using wearable devices. More particularly, the disclosure relates to a method for measuring heart rate with motion artifact resistance and a device for measuring heart rate with motion artifact resistance that can be embedded into various wearable devices, such as smart watches, fitness bracelets, or the like.

2. Description of Related Art

There are devices for measuring heart rate based on photoplethysmography (PPG) or electrocardiography (ECG) which provide an accurate measurement in a stationary state of a person. There are also PPG or ECG based heart rate measurement devices embedded into wearable devices that provide measurement when the person is moving. However, the heart rate measurement with the wearable device, when the person is moving, can be inaccurate due to motion artifacts caused by the movement of the device in relation to a body part of the person wearing the wearable device. The motion artifacts introduce distortions into a measurement signal and a measurement result is inaccurate. To eliminate the influence of motion artifacts in wearable devices of the related art, either a strong fixation of the device on the body is used, or the wearable devices additionally includes sensors that measure motion, and motion artifacts are compensated based on the measurements of these sensors.

The strong fixation of the heart rate measurement device on the body causes discomfort of wearing this device, and additional sensors and circuits for compensating the motion artifacts increase a size and weight of the device, furthermore, complicate a structure of the device and complicate signal processing.

In prior art, technical solutions for measuring heart rate are known.

The U.S. Pat. No. 4,476,875A issued on 16 Oct., 1984 and titled as "METHOD AND APPARATUS FOR MEASURING FLOW MOTIONS IN A FLUID", proposes a technical solution in which a body portion is illuminated with monochromatic light from a laser, a light scattered from particles in a fluid and from any surrounding stationary structures is transmitted separately to two separate photodetectors. From an output signal of each photodetector a signal is derived, which contains the beat frequency components resulting from interference between light components received by the photodetector, which have different frequencies due to the Doppler frequency shift of the light scattered by moving particles. The two signals so derived from the output signals of the two photodetectors are subtracted from each other and the signal resulting from this subtraction is used as a measure of flow motions in the fluid. In this technical solution, units of device including amplifiers and analog filters are included in a differential circuit instead of photodetectors. Such solution increases requirements for elements of the electrical circuit, such as the linearity and stability of the amplifiers, the identity of electrical characteristics of all elements included in the differential circuit. In addition, a balanced scheme for arranging photodetectors in relation to the light source, i.e., equality of distances from the light source to each photodetector and equality of photodetector parameters, such as sensitivity, detection area, or the like, are not disclosed. This solution uses optical fiber and many signal processing units, therefore, this solution has large size and heavy weight and is intended for stationary measurements and is not suitable for embedding into wearable devices.

The International Patent Application WO 2007/122375A1 published on 1 Nov., 2007 and titled as "PHOTOPLETHYSMOGRAPHY" proposes a photoplethysmograph device that includes a light source for illuminating a target object. A modulator drives the light source such that the output intensity varies as a function of a modulation signal at a modulation frequency. A detector receives light from the target object and generates an electrical output as a function of the intensity of received light. A demodulator with a local oscillator receives the detector output and produces a demodulated output representing the modulation signal. The demodulator is insensitive to any phase difference between the modulation signal and the oscillator of the demodulator. From the demodulated output, a signal indicative of blood volume as a function of time and/or blood composition is generated. A number of demodulators may be provided to derive signals from multiple light sources of different wavelengths, or from an array of detectors. The plethysmograph may operate in a transmission mode or a reflectance mode. While being in a reflectance mode, the device may use the green part of the optical spectrum and may use polarizing filters. This technical solution is intended for measurements in a stationary state, since it does not eliminate the motion artifacts that distort the measurement signal. In addition, the photoplethysmograph device is not suitable for embedding into wearable devices due to the complexity of the device structure and the inability to compensate for the motion artifacts.

The U.S. Pat. No. 10,849,513B2 issued on 1 Dec., 2020 and titled as "SENSING AT LEAST ONE BIOLOGICAL PARAMETER, E.G., HEART RATE OR HEART RATE VARIABILITY OF A SUBJECT" proposes a device for sensing at least one biological parameter (e.g., heart rate, heart rate variability) of a subject, the device including a contact surface configured for being brought into a contact with a skin surface of the subject. The device has at least one light source for illuminating the skin surface through the contact surface along an illumination source optical axis with illumination including at least one sensing wavelength, and at least one detector for detecting a response of said illumination at least at said wavelength, from the skin surface through the contact surface along a detector optical axis, and providing signals configured for determining said biological parameter based thereon, said illumination optical axis forming with said contact surface an acute included angle. This device does not compensate for the motion artifacts and requires strong fixation on the body portion.

The US Patent Application US20100298657A1 published on 25 Nov., 2010 and titled as "METHOD FOR CONTINU- OUSLY MONITORING A PATIENT USING A BODY-WORN DEVICE AND ASSOCIATED SYSTEM FOR ALARMS/ALERTS" proposes a body-worn monitor that measures a patient's vital signs (e.g., blood pressure, SpO2, heart rate, respiratory rate, and temperature) while simultaneously characterizing their activity state (e.g., resting, walking, convulsing, falling). The body-worn monitor processes this information to minimize corruption of the vital signs by motion-related artifacts. A software framework generates alarms/alerts based on threshold values that are either preset or determined in real time. The framework additionally includes a series of 'heuristic' rules that take the patient's activity state and motion into account, and process the vital signs accordingly. These rules, for example, indicate that a walking patient is likely breathing and has a regular heart rate, even if their motion-corrupted vital signs suggest otherwise. This technical solution includes several motion-detecting sensors to compensate for the movement of a part of the human body. It also requires additional complex calculations to compensate for the movement of the part of the human body.

Current devices for measuring heart rate have the following disadvantages. The known devices for measuring heart rate are either designed to measure in a stationary state, or require a strong fixation of the device on the body, or have a complex structure with additional sensors that detect the movement of the part of the human body.

A measurement device capable of providing accurate heart rate measurement even under intensive motion conditions without strong fixation of the measurement device on the body, having small size, simple structure, and without complex signal processing is required. The disclosure has been made to overcome above disadvantages and to provide advantages described below.

The above information is presented as background information only to assist with an understanding of the disclosure. No determination has been made, and no assertion is made, as to whether any of the above might be applicable as prior art with regard to the disclosure.

SUMMARY

The aim of the disclosure is to simplify a structure, to reduce a size and to simplify a signal processing of a device for measuring heart rate with motion artifact resistance that does not require strong fixation on a human body and can be embedded into wearable devices, such as smart watches, fitness bracelets, or the like.

Aspects of the disclosure are to address at least the above-mentioned problems and/or disadvantages and to provide at least the advantages described below. Accordingly, an aspect of the disclosure is to provide a method for measuring heart rate with motion artifact resistance and a device for measuring heart rate with motion artifact resistance that can be embedded into various wearable devices, such as smart watches, fitness bracelets, or the like.

Additional aspects will be set forth in part in the description which follows and, in part, will be apparent from the description, or may be learned by practice of the presented embodiments.

In accordance with an aspect of the disclosure, a method for measuring heart rate is provided. The method includes illuminating a body portion with light emitted from a light source, detecting light scattered by tissues of the body portion and blood particles by a plurality of photodetectors including at least one pair of photodetectors which are connected in anti-parallel in each pair of photodetectors, eliminating a frequency component of motion artifacts in an analog photocurrent differential signal by subtracting a first analog photocurrent signal detected by a first photodetector of a pair of photodetectors of the at least one pair of the photodetectors from a second analog photocurrent signal detected by a second photodetector of the pair of photodetectors, converting the analog photocurrent differential signal into an analog voltage differential signal, converting the analog voltage differential signal into a digital differential signal, calculating an envelope of the digital differential signal, and calculating the heart rate from peaks of the calculated envelope of the digital differential signal.

In accordance with another aspect of the disclosure, a device for measuring heart rate is provided. The device includes a light source configured to illuminate a body portion with light, a plurality of photodetectors including at least one pair of photodetectors which are connected in anti-parallel in each pair of photodetectors, memory storing one or more computer programs, and one or more processors communicatively coupled to the light source, the plurality of photodetectors, and the memory, wherein the one or more computer programs include computer-executable instructions that, when executed by the one or more processors individually or collectively, cause the device to detect light scattered by tissues of the body portion and blood particles, and eliminate a frequency component of motion artifacts in an analog photocurrent differential signal by subtracting a first analog photocurrent signal detected by a first photodetector of a pair of photodetectors of the at least one pair of the photodetectors from a second analog photocurrent signal detected by a second photodetector of the pair of photodetectors, a converter configured to convert the analog photocurrent differential signal into an analog voltage differential signal, and convert the analog voltage differential signal into a digital differential signal, and a calculator configured to calculate an envelope of the digital differential signal, and calculate the heart rate from peaks of the calculated envelope of the digital differential signal.

In accordance with another aspect of the disclosure, a method for measuring heart rate is provided. The method includes illuminating a body portion with coherent light emitted from a light source, detecting light scattered by tissues of the body portion and blood particles by a plurality of photodetectors, including a first subset of photodetectors connected in one direction, and a second subset of photodetectors connected in a second direction opposite to the first direction, converting, by at least two converters, at least one first analog photocurrent signal detected by the first subset of photodetectors into at least one first analog voltage signal, and at least one second analog photocurrent signal detected by the second subset of photodetectors into at least one second analog voltage signal, converting, by the at least two converters, the at least one first analog voltage signal into at least one first digital signal, and the at least one second analog voltage signal into at least one second digital signal, eliminating a frequency component of motion artifacts in a digital differential signal by subtracting the at least one first digital signal from the at least one second digital signal, calculating an envelope of the digital differential signal, and calculating the heart rate from peaks of the calculated envelope of the digital differential signal.

In accordance with another aspect of the disclosure, a device for measuring heart rate is provided. The device includes a light source configured to illuminate a body portion with coherent light, a plurality of photodetectors including a first subset of photodetectors connected in one direction, and a second subset of photodetectors connected in a second direction opposite to the first direction, wherein the plurality of photodetectors is configured to detect light scattered by tissues of the body portion and blood particles, at least two converters including at least one first converter connected to the first subset of photodetectors, configured to covert at least one first analog photocurrent signal detected by the first subset of photodetectors into at least one first analog voltage signal, and convert the at least one first analog voltage signal into at least one first digital signal, and at least one second converter connected to the second subset of photodetectors, configured to covert at least one second analog photocurrent signal detected by the second subset of photodetectors into at least one second analog voltage signal, and convert the at least one second analog voltage signal into at least one second digital signal, a calculator configured to eliminate a frequency component of motion artifacts in a digital differential signal by subtracting the at least one first digital signal from the at least one second digital signal, calculate an envelope of the digital differential signal, and calculate the heart rate from peaks of the calculated envelope of the digital differential signal.

In accordance with another aspect of the disclosure, one or more non-transitory computer-readable storage media storing computer-executable instructions that, when executed by one or more processors of a device individually or collectively, cause the device to perform operations are provided. The operations include illuminating a body portion with coherent light emitted from a light source, detecting light scattered by tissues of the body portion and blood particles by a plurality of photodetectors, comprising a first subset of photodetectors connected in one direction, and a second subset of photodetectors connected in a second direction opposite to the first direction, converting, by at least two converters, at least one first analog photocurrent signal detected by the first subset of photodetectors into at least one first analog voltage signal, and at least one second analog photocurrent signal detected by the second subset of photodetectors into at least one second analog voltage signal, converting, by the at least two converters, the at least one first analog voltage signal into at least one first digital signal, and the at least one second analog voltage signal into at least one second digital signal, eliminating a frequency component of motion artifacts in a digital differential signal by subtracting the at least one first digital signal from the at least one second digital signal, calculating an envelope of the digital differential signal, and calculating the heart rate from peaks of the calculated envelope of the digital differential signal.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Additionally, it should be understood that the terms "comprises", "comprising", "includes" and/or "including", when used in this application, mean the presence of the stated features, values, operations, elements and/or components, but do not exclude the presence or addition of one or more other features, values, operations, elements, components, and/or their groups.

It should be appreciated that the blocks in each flowchart and combinations of the flowcharts may be performed by one or more computer programs which include computer-executable instructions. The entirety of the one or more computer programs may be stored in a single memory device or the one or more computer programs may be divided with different portions stored in different multiple memory devices.

Any of the functions or operations described herein can be processed by one processor or a combination of processors. The one processor or the combination of processors is circuitry performing processing and includes circuitry like an application processor (AP, e.g., a central processing unit (CPU)), a communication processor (CP, e.g., a modem), a graphical processing unit (GPU), a neural processing unit (NPU) (e.g., an artificial intelligence (AI) chip), a wireless-fidelity (Wi-Fi) chip, a Bluetooth™ chip, a global positioning system (GPS) chip, a near field communication (NFC) chip, connectivity chips, a sensor controller, a touch controller, a finger-print sensor controller, a display drive integrated circuit (IC), an audio CODEC chip, a universal serial bus (USB) controller, a camera controller, an image processing IC, a microprocessor unit (MPU), a system on chip (SoC), an IC, or the like.

Figure 1:
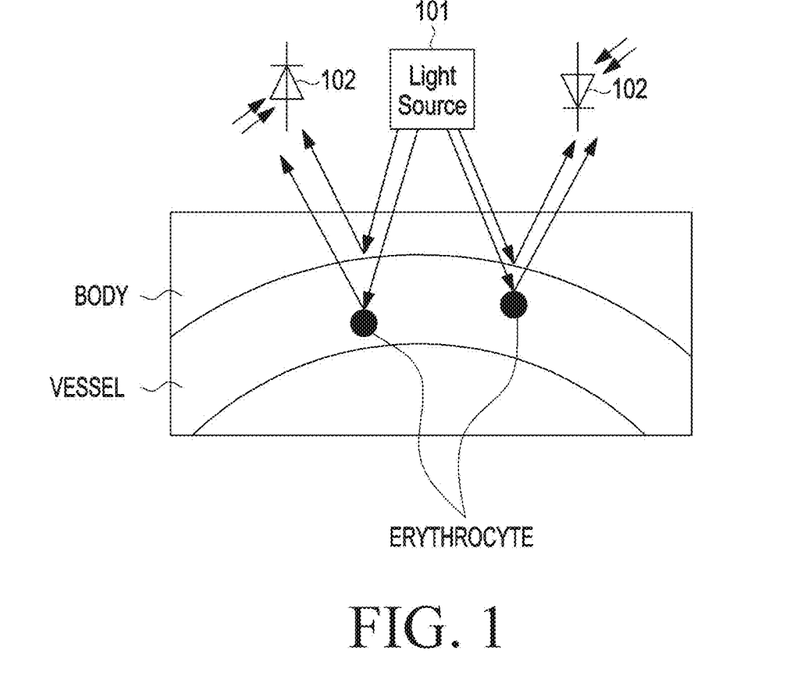
FIG. 1 schematically illustrates a heart rate detection process methods according to an embodiment of the disclosure.

FIG. 1 illustrates the photoplethysmography process used to measure heart rate according to an embodiment of the disclosure.

Referring to FIG. 1, a light source 101 illuminates the body portion with coherent light, and at least two photodetectors 102 detect light scattered by the tissues of the body portion and the blood particles. The intensity of the detected light and, consequently, the magnitude of the photodetector signal are proportional to the change in blood volume in the examined body portion during contraction and relaxation of the heart muscle. The more blood is in a vessel, i.e., the more erythrocytes scattering the light in it, the stronger the light is reflected from them and the magnitude of the photodetector signal is higher. In FIG. 1, only two photodetectors 102 are shown, however, the disclosure is not limited to two photodetectors 102, and the device for measuring heart rate according to the disclosure may include more than two photodetectors 102.

In the disclosure, it is preferable to use a coherent light source having small size, for example, a laser light-emitting diode (LED), as the light source 101. However, the disclosure is not limited to the laser LED, the light source 101 can be any coherent light source that has size allowing to embed it into a wearable device, for example, a smart watch, fitness bracelet, or the like.

The photodetectors 102 can be any photodetectors operating in the photodiode mode, the output of which is a current signal. Two or more photodetectors 102 are connected in anti-parallel to provide a differential connection of photodetectors 102. The light source and photodetectors form a balanced optical scheme.

Figure 2:
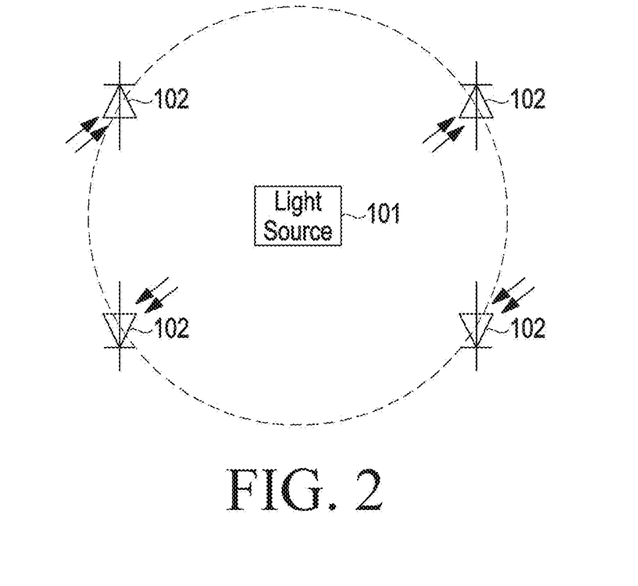
FIG. 2 schematically illustrates a balanced optical scheme methods according to an embodiment of the disclosure.

FIG. 2 schematically illustrates a balanced optical scheme according to an embodiment of the disclosure.

Referring to FIG. 2, the balanced optical scheme is the arrangement of the photodetectors 102 at the same distances from the light source 101 as shown by a broken line circle in FIG. 2 and the photodetectors 102 have the same parameters, such as sensitivity, detection area, and so on. For example, the photodetectors 102 can be symmetrically arranged with respect to the light source 101. The symmetrical arrangement of the photodetectors 102 can better eliminate motion artifacts that occur in different directions of movement of the device 100 in relation to the body portion in which the measurement is made. However, the disclosure is not limited to the symmetrical arrangement of the photodetectors 102 in relation to the light source 101, the main condition is the arrangement of the photodetectors 102 at the same distance from the light source 101. A balanced optical scheme provides signals having the same frequency component of the motion artifacts from all photodetectors 102 due to the arrangement of the photodetectors 102 at the same distance from the light source 101 and the same parameters of all photodetectors 102, such as sensitivity, detection area, or the like.

Figure 3:
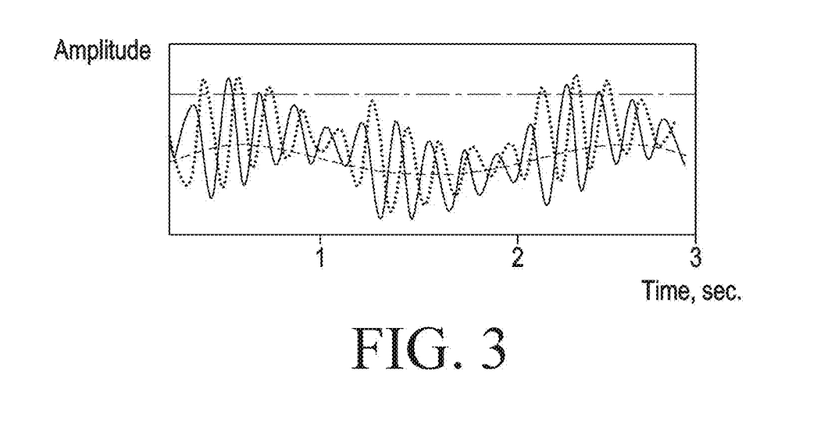
FIG. 3 illustrates analog signals detected by photodetectors methods according to an embodiment of the disclosure.
Figure 4:
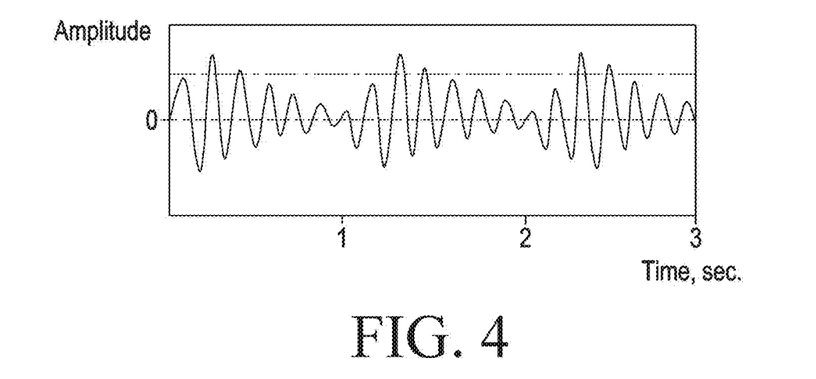
FIG. 4 illustrates an analog differential signal methods according to an embodiment of the disclosure.
Figure 5:
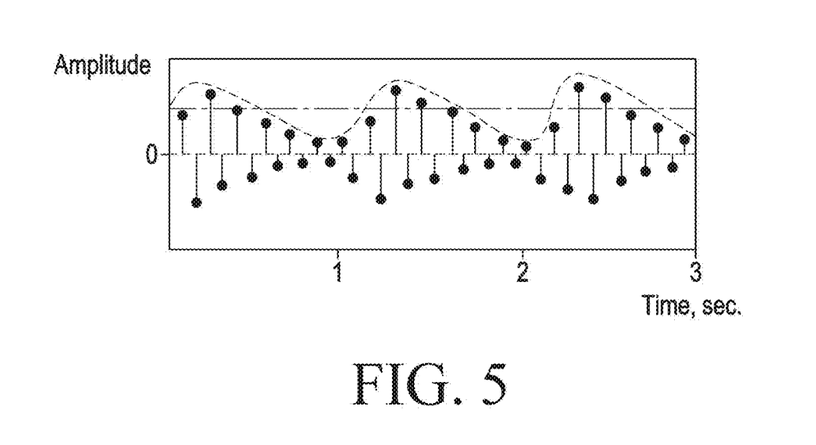
FIG. 5 illustrates a digital differential signal and its envelope methods according to an embodiment of the disclosure.

FIGS. 3, 4, and 5 schematically illustrate signals from photodetectors before and after conversion.

FIG. 3 illustrates analog signals detected by photodetectors according to an embodiment of the disclosure.

Referring to FIG. 3, only two analog signals from two photodetectors 102 connected in anti-parallel are shown. One analog signal is shown as a solid curved line, and the other analog signal is shown as a dotted curved line. However, the number of signals in the disclosure may be equal to the number of the photodetectors 102. The frequency component of the motion artifacts in the signals of the photodetectors 102 is depicted by a dashed curved line. The frequency component of the motion artifacts is introduced into the signals of the photodetectors 102 due to the movement of the device for measuring heart rate in relation to the body portion where the heart rate is measured. An oscillation frequency of the frequency component of the motion artifacts of the signals of the photodetectors 102 is defined by the frequency of the movement of the device 100 for measuring heart rate in relation to the body portion in which the heart rate measurement is performed. To simplify the illustration of the analog signals detected by the photodetectors 102, the frequency component of the motion artifacts is shown as a smooth curved line. However, in real practice, the frequency component of the motion artifacts has a variable oscillation frequency depending on the frequency of the movement of the device 100 for measuring heart rate in relation to the body portion in which the heart rate measurement is performed, since the movements of the device 100 can occur in different directions and at different frequencies. In different parts of the detected signal, the frequency component of the motion artifacts may have the same oscillation frequency as the heart rate, higher or lower than the heart rate. Therefore, the frequency component of the motion artifacts cannot be eliminated by filtering the detected signal. The detection level is depicted by a dash-dotted straight line. The detection level is set in advance so as to take into account all heartbeats, for example, when performing the measurement without moving the device for measuring heart rate in relation to the body portion, i.e., when the frequency component of the motion artifacts is not introduced into the photodetector signals. As shown in the middle part of the waveform of the photodetectors 102, not all heartbeats are detected due to the influence of the frequency component of the motion artifacts.

FIG. 4 illustrates an analog differential signal according to an embodiment of the disclosure.

Referring to FIG. 4, it illustrates the analog differential signal obtained by subtracting the signals of the photodetectors 102 due to the connection of the photodetectors 102 in a differential circuit. The differential signal is shown as a solid curved line. Since the photodetectors 102 and the light source 101 form a balanced optical scheme, the frequency component of the motion artifacts in all signals of the photodetectors 102 will be the same and will be reduced when the signals are subtracted, as shown by the dotted straight line passing through the value 0 on the vertical axis of the graph. Therefore, the influence of the motion artifacts is eliminated, and all heartbeats can be detected at the detection level depicted by the dash-dotted straight line.

FIG. 5 illustrates a digital differential signal and its envelope according to an embodiment of the disclosure.

Referring to FIG. 5, to improve the accuracy of heartbeat detection, an analog photocurrent differential signal of the photodetectors 102 is converted into an analog voltage differential signal to increase the signal-to-noise ratio, and the analog voltage differential signal is converted into a digital differential signal. The envelope of the digital differential signal is then calculated by, for example, using a Hilbert transform, a digital low-pass filter, or the like. The envelope is shown as a dashed curved line. Any known method for calculating the envelope of the digital signal can be used in the disclosure. Methods for calculating the envelope of a digital signal are known in the art and therefore their description is omitted. The detection level is depicted by the dash-dotted straight line. The heart rate is calculated from peaks in the envelope of the digital differential signal, that reach or exceed the detection level. The horizontal axis in the graph represents time in seconds and, therefore, it is possible to count the number of peaks that reach or exceed the detection level over time, i.e., to calculate heart rate. For example, FIG. 5 illustrates 3 peaks per 3 seconds, hence, the heart rate shown in FIG. 5 is 60 heartbeats per minute.

FIGS. 3 to 5 illustrate only one of the signal processing orders in the disclosure. In the disclosure, it is also possible, in first, to convert the analog photocurrent signals detected by the photodetectors 102 into the analog voltage signals, to convert the analog voltage signals into digital signals, and then to obtain the digital differential signal by subtracting the digital signals and to calculate its envelope.

Hereinafter, various embodiments of the disclosure are described with reference to the accompanying drawings.

Figure 12:
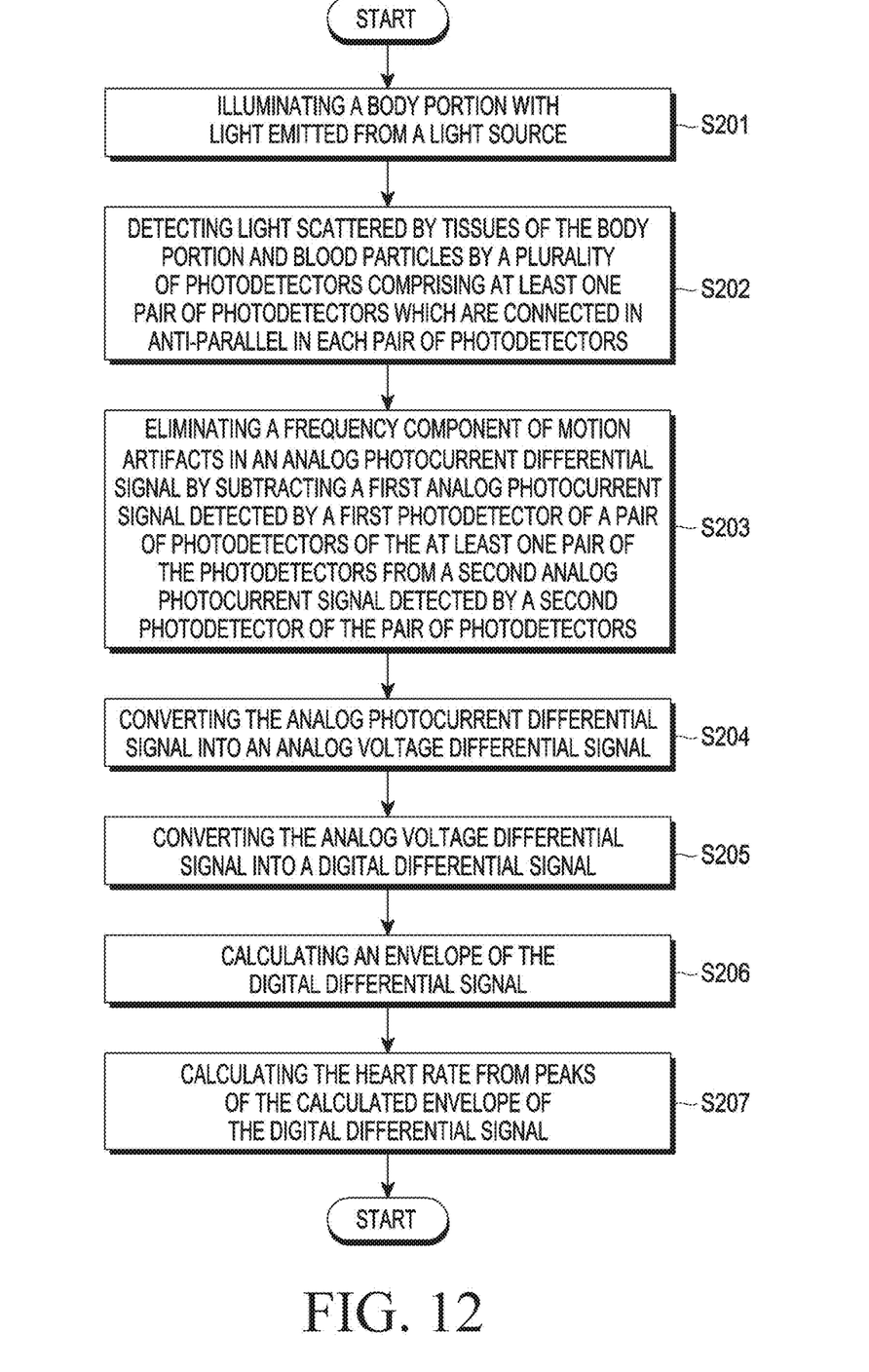
FIG. 12 is a flowchart of a method for measuring heart rate according to an embodiment of the disclosure.

FIG. 12 is a flowchart of a method for measuring heart rate according to an embodiment of the disclosure. The method may be performed by a device 100 in one of FIGS. 6 to 8.

Referring to FIG. 12, in operation S201, the body portion is illuminated with light emitted from the light source 101. The light emitted from the light source 101 may be coherent.

In operation S202, the light from the light source 101 scattered by the tissues of the body portion and blood particles is detected by a plurality of photodetectors comprising at least one pair of photodetectors 102. The photodetectors 102 in each pair of photodetectors are connected in anti-parallel. The light source 101 and the photodetectors 102 may form the balanced optical scheme.

In some aspects of the disclosure, the light scattered by the tissues of the body portion and the blood particles may be detected through a converging lens disposed in front of the light source 101 and each photodetector 102.

In operation S203, the frequency component of the motion artifacts in the analog photocurrent differential signal is eliminated by subtracting the first analog photocurrent signal detected by a first photodetector 102 of the pair of photodetectors 102 of the at least one pair of the photodetectors from a second analog photocurrent signal detected by second photodetector 102 of the pair of photodetectors 102.

In operation S204, the analog photocurrent differential signal obtained in operation S203 is converted into an analog voltage differential signal. Operation 203 may be performed by a transimpedance amplifier (TIA) in a converter 103.

Figure 7:
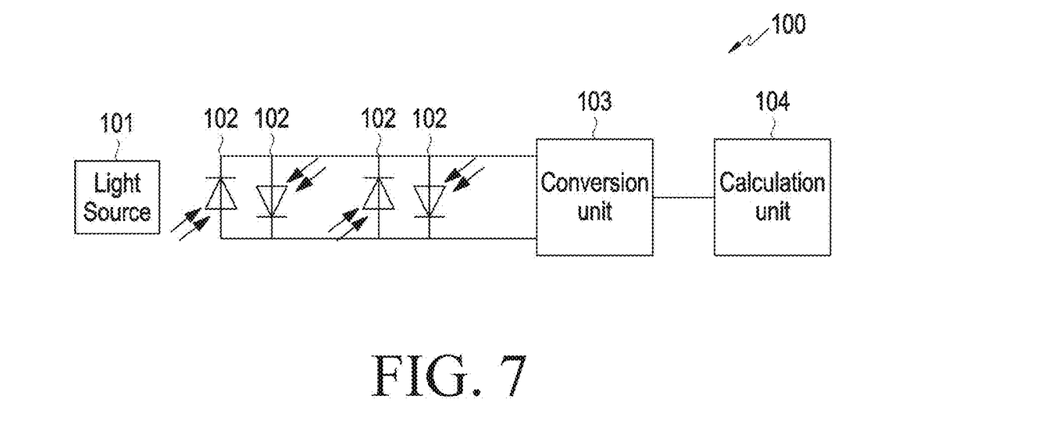
FIG. 7 is a block diagram of a device for measuring heart rate according to an embodiment of the disclosure.
Figure 8:
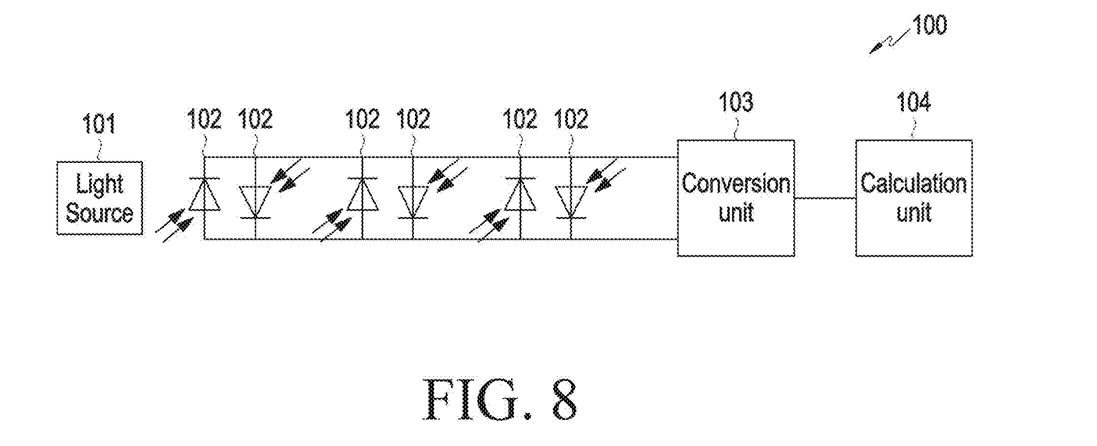
FIG. 8 is a block diagram of a device for measuring heart rate according to an embodiment of the disclosure.

The at least one pair of photodetectors may comprise at least two pairs of photodetectors connected in parallel to obtain a summed analog photocurrent differential signal as shown in FIGS. 7 and 8. Then, the method 200 may comprise converting the summed analog photocurrent differential signal into a summed analog voltage differential signal, and converting the summed analog voltage differential signal into the digital differential signal.

In operation S205, the analog voltage differential signal obtained in operation S204 is converted into the digital differential signal. Operation 204 may be performed by an analog-to-digital converter (ADC) in the converter 103.

In operation S206, the envelope of the digital differential signal obtained in operation S205 is calculated.

In operation S207, the heart rate is calculated from the peaks of the envelope of the digital differential signal calculated in operation S206.

Figure 6:
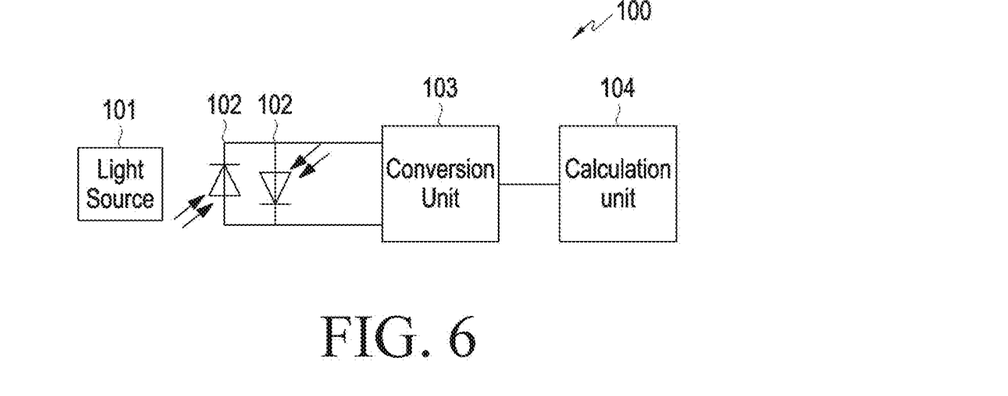
FIG. 6 is a block diagram of a device for measuring heart rate according to an embodiment of the disclosure.

FIGS. 6 to 8 show block diagrams of embodiments of a device for measuring heart rate that performs a method for measuring heart rate according to various embodiments of the disclosure. The device 100 comprises a light source 101, at least one pair of photodetectors 102, the converter 103, and a calculator 104. The converter 103 may be referred to as a converter. The calculator 104 may be referred to as a calculator.

The light source 101 illuminates the body portion with light where heart rate measurement is performed. The light emitted from the light source 101 may be coherent.

Referring to FIG. 6, the device 100 may comprise one pair of photodetectors 102. Referring to FIG. 7, device 100 may comprise two pairs of photodetectors 102. Referring to FIG. 8, device 100 may comprise more than two pairs of photodetectors 102.

The at least one pair of photodetectors 102 detects the light from the light source 101 scattered by the tissues of the body portion and blood particles. The photodetectors 102 in each pair of photodetectors are connected in anti-parallel. The light source 101 and the photodetectors 102 form the balanced optical scheme. The balanced optical scheme provides signals having the same frequency component of the motion artifacts from all photodetectors 102 due to the arrangement of the photodetectors 102 at the same distance from the light source 101 and the same parameters of all photodetectors 102, such as sensitivity, detection area, or the like. By connecting the photodetectors 102 in anti-parallel, i.e., in a differential circuit, the pair of photodetectors 102 outputs the analog photocurrent differential signal by subtracting the analog photocurrent signal detected by one photodetector 102 of the pair of photodetectors 102 from the analog photocurrent signal detected by another photodetector 102 of the pair of photodetectors 102. Since the signals from all photodetectors 102 have the same frequency component of the motion artifacts, the subtraction of the signals eliminates the frequency component of the motion artifacts in the analog photocurrent differential signal.

The converter 103 comprises the transimpedance amplifier (TIA) and the analog-to-digital converter (ADC). The TIA converts the analog photocurrent differential signal into the analog voltage differential signal. The ADC converts the analog voltage differential signal into the digital differential signal.

The calculator 104 calculates the envelope of the digital differential signal, and calculates the heart rate from the peaks of the calculated envelope of the digital differential signal.

If the device 100 comprises two or more pairs of photodetectors 102 as shown in the embodiments on FIGS. 7 and 8, the pairs of photodetectors 102 are connected in parallel to produce a summed analog photocurrent differential signal. The converter 103 converts the summed analog photocurrent differential signal into a summed analog voltage differential signal by the TIA, and converts the summed analog voltage differential signal into the digital differential signal by the ADC.

Figure 11:
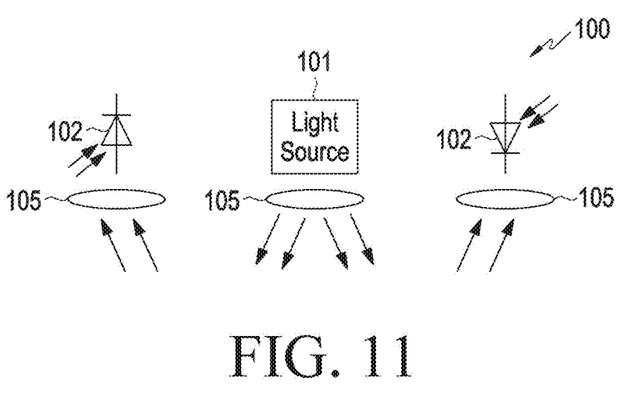
FIG. 11 is a block diagram of a device for measuring heart rate according to an embodiment of the disclosure.

FIG. 11 illustrates an embodiment of a device according to an embodiment of the disclosure, in which the device according to all of the above embodiments may further comprise a converging lens 105 in front of the light source 101 and each photodetector 102. The converging lens 105 allow to get a stronger signal and increase the signal-to-noise ratio of the processed signals.

The device 100 according to all of the above embodiments may be embedded into a wearable device for measuring heart rate, such as a smart watch, a fitness bracelet, or the like.

Figure 13:
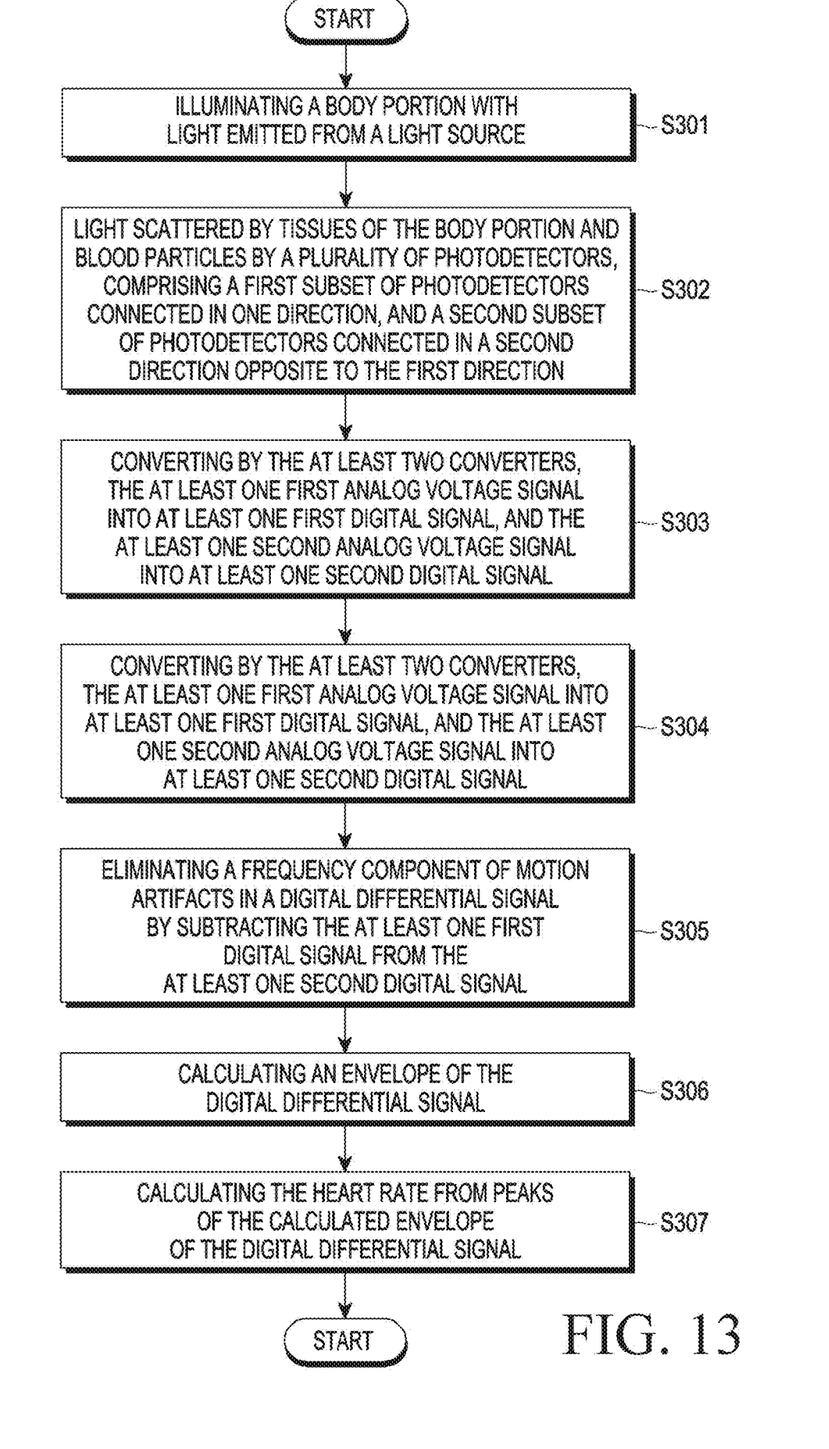
FIG. 13 is a flowchart of a method for measuring heart rate according to an embodiment of the disclosure.

FIG. 13 is a flowchart of a method for measuring heart rate according to an embodiment of the disclosure. The method may be performed by a device 100 in one of FIGS. 9 and 10.

Referring to FIG. 13, in operation S301, the body portion is illuminated with light emitted from the light source 101. The light emitted from the light source 101 may be coherent.

In operation S302, the light from the light source 101 scattered by the tissues of the body portion and blood particles is detected by a plurality of photodetectors 102. The plurality of photodetectors 102 comprises a first subset of photodetectors 102 connected in one direction and a second subset of photodetectors 102 connected in a second direction opposite to the first direction, i.e., the first subset of photodetectors 102 and the second subset of photodetectors 102 form a differential circuit. At least one photodetector 102 is connected to a separate converter 103 comprising the TIA and the ADC. The light source 101 and the photodetectors 102 may form the balanced optical scheme.

In some aspects of the disclosure, the light scattered by the tissues of the body portion and the blood particles may be detected through a converging lens disposed in front of the light source 101 and each photodetector 102.

In operation S303, by at least two converters 103, the at least one first analog photocurrent signal detected by the first subset of photodetectors is converted into at least one first analog voltage signal, and at least one second analog photocurrent signal detected by the second subset of photodetectors is converted into at least one second analog voltage signal. Operation 303 may be performed by the TIA in each of the at least two converters 103.

Figure 10:
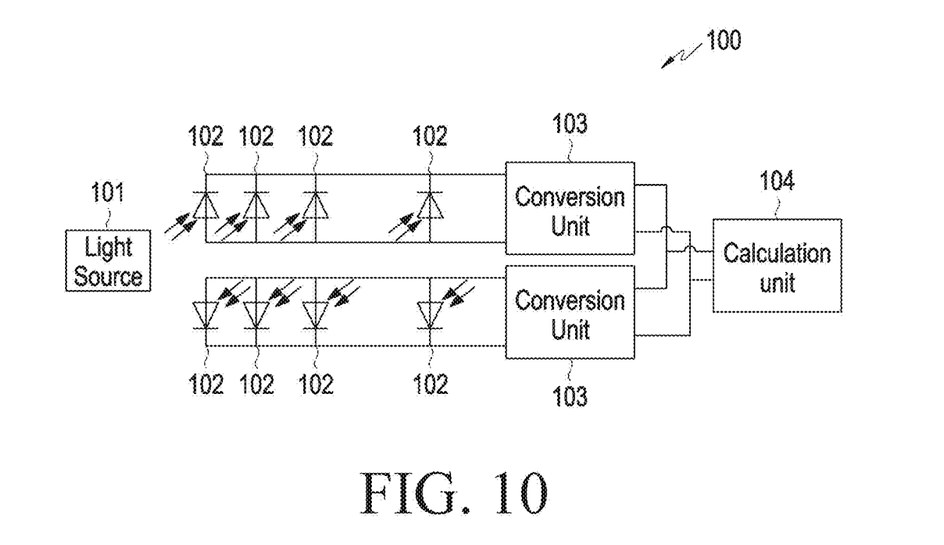
FIG. 10 is a block diagram of a device for measuring heart rate according to an embodiment of the disclosure.

The first subset of photodetectors may be connected in parallel, and the second subset of photodetectors may be connected in parallel as shown in FIG. 10. Then, the at least one first analog photocurrent signal detected by the first subset of photodetectors may be converted into the at least one first analog voltage signal using only a first conversion unit of the at least two conversion units, and the at least one second analog photocurrent signal detected by the second subset of photodetectors may be converted into the at least one second analog voltage signal using only a second conversion unit of the at least two conversion units.

Figure 9:
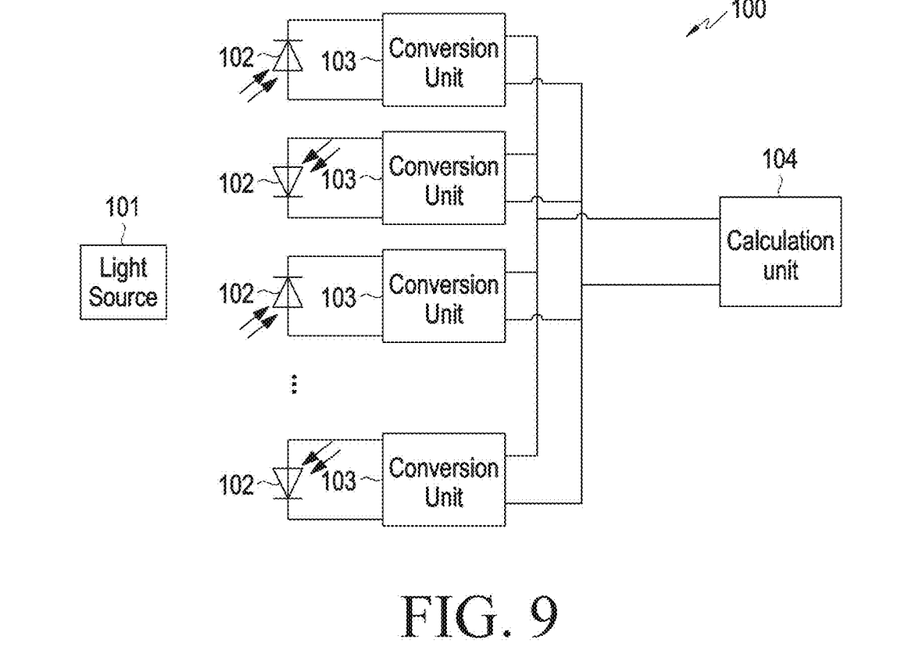
FIG. 9 is a block diagram of a device for measuring heart rate according to an embodiment of the disclosure.

The least two converters may comprise a plurality of conversion units having the number same as a number of the plurality of photodetectors as shown in FIG. 9. Then, the analog photocurrent signal detected by each of the plurality of photodetectors may converted into the analog voltage signal using respective conversion unit of the plurality of conversion units.

In operation S304, by at least two converters 103, the at least one first analog voltage signal is converted into at least one first digital signal, and the at least one second analog voltage signal is converted into at least one second digital signal. Operation 304 may be performed by the ADC in each of the at least two converters 103.

In operation S305, the frequency component of the motion artifacts is eliminated in the digital differential signal by subtracting the at least one first digital signal obtained from the at least one first analog photocurrent signal detected by the first subset of photodetectors from the at least one second digital signal obtained from the at least one second analog photocurrent signal detected by the second subset of photodetectors.

In operation S306, the envelope of the digital differential signal obtained in operation S305 is calculated.

In operation S307, the heart rate is calculated from the peaks of the envelope of the digital differential signal calculated in operation S306.

FIGS. 9 and 10 show block diagrams of embodiments of a device 100 for measuring heart rate that performs the method 300 for measuring heart rate according to various embodiments of the disclosure. The device 100 comprises the light source 101, the plurality of photodetectors 102, the converter 103, and the calculator 104. The converter 103 may be referred to as a converter. The calculator 104 may be referred to as a calculator.

The light source 101 illuminates the body portion with light where heart rate measurement is performed. The light emitted from the light source 101 may be coherent.

The plurality of photodetectors 102 detect the light from the light source 101 scattered by the tissues of the body portion and blood particles. The plurality of photodetectors 102 consists of the first subset of photodetectors 102 connected in one direction and the second subset of photodetectors 102 connected in the second direction opposite to the first direction. The light source 101 and the photodetectors 102 form the balanced optical scheme. The balanced optical scheme provides signals having the same frequency component of the motion artifacts from all photodetectors 102 due to the arrangement of the photodetectors 102 at the same distance from the light source 101 and the same parameters of all photodetectors 102, such as sensitivity, detection area, or the like.

Each of the at least two converters 103 comprises the TIA and the ADC. Each converter 103 is connected to at least one photodetector 102. Each converter 103 converts the analog photocurrent signal detected by at least one photodetector 102 into the analog voltage signal by the TIA, and converts the analog voltage signal into the digital signal by the ADC.

The calculator 104 calculates the digital differential signal by subtracting the digital signals obtained by the at least one converter 103 from the analog photocurrent signals detected by the first subset of the photodetectors 102 from the digital signals obtained by the at least one converter 103 from the analog photocurrent signals detected by the second subset of photodetectors. The subtraction of the digital signals eliminates the frequency component of the motion artifacts in the digital differential signal, since all signals have the same frequency component of the motion artifacts. The calculator 104 calculates the envelope of the digital differential signal, and calculates the heart rate from the peaks of the calculated envelope of the digital differential signal.

Referring to FIG. 9, in the device 100, the number of converters 103 is equal to the number of photodetectors 102. One converter 103 is connected to one photodetector 102.

Referring to FIG. 10, device 100 comprises a first parallel connection scheme of the first subset of photodetectors 102, a second parallel connection scheme of the second subset of photodetectors 102, and two converters 103. One converter 103 is connected to the first parallel connection scheme of the first subset of photodetectors 102, and the other converter 103 is connected to the second parallel connection scheme of the second subset of photodetectors 102.

FIG. 11 partially shows yet another embodiment of the device 100, in which the device 100 according to all of the above embodiments may further comprise the converging lens 105 in front of the light source 101 and each photodetector 102. The converging lens 105 allow to get a stronger signal and increase the signal-to-noise ratio of the processed signals.

The device 100 according to all of the above embodiments may be embedded into a wearable device for measuring heart rate, such as a smart watch, a fitness bracelet, or the like.

The above descriptions of the embodiments are illustrative, and configuration modifications and implementations are within the scope of the description. Although the subject matter is described in a language characteristic of structural features or methodological operations, it is clear that the subject matter defined by the proposed claims is not necessarily limited by the specific features or operations described above. Moreover, the specific features and operations described above are disclosed as embodiments of the claims.

It will be appreciated that various embodiments of the disclosure according to the claims and description in the specification can be realized in the form of hardware, software or a combination of hardware and software.

Any such software may be stored in non-transitory computer readable storage media. The non-transitory computer readable storage media store one or more computer programs (software modules), the one or more computer programs include computer-executable instructions that, when executed by one or more processors of an electronic device, cause the electronic device to perform a method of the disclosure.

Any such software may be stored in the form of volatile or non-volatile storage, such as, for example, a storage device like read only memory (ROM), whether erasable or rewritable or not, or in the form of memory, such as, for example, random access memory (RAM), memory chips, device or integrated circuits or on an optically or magnetically readable medium, such as, for example, a compact disk (CD), digital versatile disc (DVD), magnetic disk or magnetic tape or the like. It will be appreciated that the storage devices and storage media are various embodiments of non-transitory machine-readable storage that are suitable for storing a computer program or computer programs comprising instructions that, when executed, implement various embodiments of the disclosure. Accordingly, various embodiments provide a program comprising code for implementing apparatus or a method as claimed in any one of the claims of this specification and a non-transitory machine-readable storage storing such a program.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by an electronic device for measuring a heart rate, the method comprising:
   illuminating, by the electronic device, a body portion with coherent light emitted from a light source of the electronic device;
   detecting, by the electronic device, light scattered by tissues of the body portion and blood particles by a plurality of photodetectors of the electronic device, comprising a first subset of photodetectors connected in a first configuration, and a second subset of photodetectors connected in a second configuration anti-parallel to the first configuration;
   generating, by the electronic device, at least one first analog photocurrent signal based on light detected by the first subset of photodetectors and at least one second analog photocurrent signal based on light detected by the second subset of photodetectors;
   converting, by at least two converters of the electronic device, the at least one first analog photocurrent signal into at least one first analog voltage signal, and the at least one second analog photocurrent signal into at least one second analog voltage signal;
   converting, by the at least two converters, the at least one first analog voltage signal into at least one first digital signal, and the at least one second analog voltage signal into at least one second digital signal;
   generating, by the electronic device, a digital differential signal by subtracting the at least one first digital signal from the at least one second digital signal;
   calculating, by the electronic device, an envelope of the generated digital differential signal; and
   calculating, by the electronic device, the heart rate from peaks of the calculated envelope of the digital differential signal.

2. The method of claim 1,
   wherein the first subset of photodetectors are connected in parallel, and the second subset of photodetectors are connected in parallel, and
   wherein the at least one first analog photocurrent signal detected by the first subset of photodetectors are converted into the at least one first analog voltage signal using only a first converter of the at least two converters, and the at least one second analog photocurrent signal detected by the second subset of photodetectors are converted into the at least one second analog voltage signal using only a second converter of the at least two converters.

3. The method of claim 1,
   wherein the at least two converters comprises a plurality of converters having a number same as a number of the plurality of photodetectors, and
   wherein an analog photocurrent signal detected by each of the plurality of photodetectors is converted into an analog voltage signal using respective converter of converters.

4. The method of claim 1, wherein the light scattered by the tissues of the body portion and the blood particles is detected through a converging lens in front of the light source and each photodetector.

5. The method of claim 1, wherein distance between the light source and each of the plurality of photodetectors is the same, and at least one parameter of each of the plurality of photodetectors is the same.

6. An electronic device for measuring a heart rate, the electronic device comprising:
   a light source configured to illuminate a body portion with coherent light;
   a plurality of photodetectors comprising a first subset of photodetectors connected in a first configuration, and a second subset of photodetectors connected in a second configuration anti-parallel to the first configuration, wherein the plurality of photodetectors is configured to;
   detect light scattered by tissues of the body portion and blood particles, and generate at least one first analog photocurrent signal based on light detected by the first subset of photodetectors and at least one second analog photocurrent signal based on light detected by the second subset of photodetectors;

at least two converters comprising:

at least one first converter connected to the first subset of photodetectors, configured to covert the at least one first analog photocurrent signal into at least one first analog voltage signal; and convert the at least one first analog voltage signal into at least one first digital signal, and at least one second converter connected to the second subset of photodetectors, configured to covert the at least one second analog photocurrent signal into at least one second analog voltage signal, and convert the at least one second analog voltage signal into at least one second digital signal; and a calculator configured to:

generate a digital differential signal by subtracting the at least one first digital signal from the at least one second digital signal, calculate an envelope of the generated digital differential signal, and calculate the heart rate from peaks of the calculated envelope of the digital differential signal.

7. The electronic device of claim 6, wherein the first subset of photodetectors are connected in parallel, and the second subset of photodetectors are connected in parallel, and wherein the at least one first converter comprises only one first converter connected to the first subset of photodetectors, and the at least one second converter comprises only one second converter connected to the second subset of photodetectors.

8. The electronic device of claim 6, wherein the at least two converters comprises a plurality of converters each connected to a photodetector of the plurality of photodetectors.

9. The electronic device of claim 6, further comprising: a converging lens in front of the light source and each photodetector.

10. The electronic device of claim 6, wherein distance between the light source and each of the plurality of photodetectors is the same, and at least one parameter of each of the plurality of photodetectors is the same.

11. One or more non-transitory computer-readable storage media storing computer-executable instructions that, when executed by one or more processors of an electronic device individually or collectively, cause the electronic device to perform operations, the operations comprising:

illuminating, by the electronic device, a body portion with coherent light emitted from a light source of the electronic device;

detecting, by the electronic device, light scattered by tissues of the body portion and blood particles by a plurality of photodetectors of the electronic device, comprising a first subset of photodetectors connected in a first configuration, and a second subset of photodetectors connected in a second configuration anti-parallel to the first configuration;

generating, by the electronic device, at least one first analog photocurrent signal based on light detected by the first subset of photodetectors and at least one second analog photocurrent signal based on light detected by the second subset of photodetectors;

converting, by at least two converters of the electronic device, the at least one first analog photocurrent signal into at least one first analog voltage signal, and the at least one second analog photocurrent signal into at least one second analog voltage signal;

converting, by the at least two converters, the at least one first analog voltage signal into at least one first digital signal, and the at least one second analog voltage signal into at least one second digital signal;

generating, by the electronic device, a digital differential signal by subtracting the at least one first digital signal from the at least one second digital signal;

calculating, by the electronic device, an envelope of the generated digital differential signal; and calculating, by the electronic device, a heart rate from peaks of the calculated envelope of the digital differential signal.

12. The one or more non-transitory computer-readable storage media of claim 11, wherein the first subset of photodetectors are connected in parallel, and the second subset of photodetectors are connected in parallel, and wherein the at least one first analog photocurrent signal detected by the first subset of photodetectors are converted into the at least one first analog voltage signal using only a first converter of the at least two converters, and the at least one second analog photocurrent signal detected by the second subset of photodetectors are converted into the at least one second analog voltage signal using only a second converter of the at least two converters.

13. The one or more non-transitory computer-readable storage media of claim 11, wherein the at least two converters comprises a plurality of converters having a number same as a number of the plurality of photodetectors, and wherein an analog photocurrent signal detected by each of the plurality of photodetectors is converted into an analog voltage signal using respective converter of converters.

14. The one or more non-transitory computer-readable storage media of claim 11, wherein the light scattered by the tissues of the body portion and the blood particles is detected through a converging lens in front of the light source and each photodetector.

15. The one or more non-transitory computer-readable storage media of claim 11, wherein distance between the light source and each of the plurality of photodetectors is the same, and at least one parameter of each of the plurality of photodetectors is the same.

* * * * *